(12) United States Patent
Oh et al.

(10) Patent No.: US 6,438,998 B1
(45) Date of Patent: Aug. 27, 2002

(54) ULTRASONIC DISPERSION APPARATUS FOR SILICA SOL

(75) Inventors: Jeong-Hyun Oh, Taegukwangyok-shi; Keun-Deok Park, Pusankwangyok-shi; Dong-Joon Kim, Kyonggi-do; Young-Min Baik, Kyongsangbuk-do, all of (KR)

(73) Assignee: Samsung Electronics, Co., Ltd., Suwon (KR)

( * ) Notice: Subject to any disclaimer, the term of this patent is extended or adjusted under 35 U.S.C. 154(b) by 157 days.

(21) Appl. No.: 09/639,333

(22) Filed: Aug. 16, 2000

(30) Foreign Application Priority Data

Aug. 31, 1999 (KR) .............................. 99-36610

(51) Int. Cl.$^7$ .......................................... C03B 37/016
(52) U.S. Cl. ............................ 65/396; 65/17.2; 65/440; 420/330.1; 420/338; 516/929; 422/128
(58) Field of Search .................. 138/40, 42; 366/176.1, 366/176.2, 114; 516/110, 111, 929, 930, 931; 65/17.2, 395, 396, 440; 423/330.1, 338; 422/128

(56) References Cited

U.S. PATENT DOCUMENTS

| | | | |
|---|---|---|---|
| 3,963,640 A | * 6/1976 | Smith | 210/716 |
| 4,051,065 A | * 9/1977 | Venema | 138/42 |
| 4,343,717 A | 8/1982 | Lok | |
| 4,680,046 A | * 7/1987 | Matsuo et al. | 428/542.8 |
| 4,681,615 A | 7/1987 | Toki et al. | |
| 4,695,305 A | * 9/1987 | Clasen | 264/434 |
| 4,726,828 A | * 2/1988 | Clasen | 501/12 |
| 5,240,488 A | 8/1993 | Chandross et al. | |
| 5,279,807 A | * 1/1994 | Moffett et al. | 423/338 |
| 6,060,523 A | 5/2000 | Moffett et al. | |
| 6,063,894 A | 5/2000 | Phipps et al. | |
| 6,274,112 B1 | * 8/2001 | Moffett et al. | 423/338 |

\* cited by examiner

*Primary Examiner*—Sean Vincent
(74) *Attorney, Agent, or Firm*—Robert E. Bushnell, Esq.

(57) ABSTRACT

Disclosed are apparatus and method for ultrasonically dispersing a silica sol such as is used in a process of manufacturing a silica glass by a sol-gel method. The apparatus includes a sol feeder for holding a sol to be dispersed, a sol container for containing the ultrasonically dispersed sol, a medium tank having a liquid-phase ultrasonic medium, an ultrasonic vibrator for generating ultrasonic waves within the tank, and a sol pipe for providing a sol feeding path connecting the sol feeder and the sol container to each other, the sol pipe having a portion submerged under the ultrasonic medium in the medium tank. The portion of the sol pipe submerged under the ultrasonic medium has a shape bent in a zigzagged fashion.

24 Claims, 5 Drawing Sheets

ULTRASONIC DISPERSION APPARATUS FOR SILICA SOL

CLAIM OF PRIORITY

This application makes reference to, incorporates the same herein, and claims all benefits accruing under 35 U.S.C. § 119 from an application for ULTRASONIC DISPERSION DEVICE FOR SILICA GLASS SOL earlier filed in the Korean Industrial Property Office on the $31^{st}$ of Aug. 1999 and there duly assigned Ser. No. 36610/1999.

BACKGROUND OF THE INVENTION

1. Field of the Invention

The present invention relates to an apparatus for ultrasonically dispersing silica sol used in a process of manufacturing a silica glass by a sol-gel method.

2. Description of the Prior Art

For the manufacture of optical fiber, which is a high-speed and low-loss data transmission medium, both methods of directly drawing an optical fiber from a liquid material, for example, a double crucible process, and methods of drawing the optical fiber from a rod-shaped preform are known.

Among methods of drawing an optical fiber from a preform, various methods respectively using different preform formation processes are known, for instance, a method such as a modified chemical vapor-phase deposition (MCVD) process. In accordance with this method, a preform is formed by depositing a vapor-phase material on the inner or outer surface of a substrate tube. A method is also known in which a preform is formed by molding a core rod and an over-jacketing tube, and interconnecting the rod and tube to form the preform. Both the substrate tube of the modified chemical vapor-phase deposition process and the over-jacket tube, which are made of silica glass, are formed in the form of tubes, typically by using a sol-gel method.

In a general method of manufacturing a silica glass tube by the sol-gel method, a silica glass tube is manufactured using a mixing process, a dispersing process, a molding process, a de-molding process, a drying process, and a sintering process. An example of this method is disclosed in U.S. Pat. No. 5,240,488, to Chandross, entitled Manufacture Of Vitreous Silica Product Via A Sol-Gel Process Using A Polymer Additive.

In the mixing and dispersing procedures, a starting material is mixed with deionized water and an additive such as a dispersing agent so that the starting material is uniformly dispersed in the deionized water, thereby forming a uniform sol. The starting material may include silicon alkoxide or fumed silica. In particular, the dispersing procedure, which is adapted to uniformly disperse the start material in the deionized water, is a very important process in determining the uniformity of the final silica glass product.

In the molding procedure, the sol produced in the mixing and dispersing procedures is poured into a mold having a proper shape, for gelation. To the sol is added a binder and a gelling agent to aid in forming particle-to-particle bonds. The mold, which is used to mold a silica glass tube, for example, a substrate tube or an over-jacket tube, has a construction including a cylindrical portion and a central rod portion received in the cylindrical portion.

In the de-molding procedure, the gel molded to have a tube shape in the molding procedure is removed from the mold. This procedure may be carried out in a water tank to prevent the gel tube from being damaged.

In the drying procedure, the gel tube removed from the mold is dried using a drying means with a constant temperature and humidity chamber, and then subjected to a thermal treatment at a low temperature in order to remove or decompose residual molecular water and any organic materials present in the gel tube. And then, the gel tube is heated in an atmosphere of Cl gas to remove metallic impurities and hydrides.

In the sintering procedure, the formed body made via the drying procedure is sintered so that it is glassified. As a result, a desired silica glass product is obtained. This procedure is carried out by heating the dried and impurity-removed gel to a temperature of 1,350° C. to 1,400° C. in a sintering furnace in an atmosphere of He gas.

The dispersing procedure is carried out by a special ultrasonic dispersion device. Conventional ultrasonic dispersion devices may be classified as direct type or indirect type, the direct type class being divided into direct-static type and direct-dynamic type devices.

A conventional ultrasonic dispersion device of the above mentioned direct-static type includes a water bath with the top being opened, and a rod-shaped ultrasonic vibrator with a probe. In a dispersion process using this conventional ultrasonic dispersion device, the probe of the ultrasonic vibrator is in direct contact with a sol contained in the water bath. The ultrasonic vibrator is moved left and right or forward and rearward to disperse the sol in the water bath by ultrasonication.

A conventional ultrasonic dispersion device of the direct-dynamic type includes a dispersion chamber having a sol inlet and a sol outlet, and an ultrasonic vibrator with a probe positioned in the dispersion chamber. In a dispersion process using this ultrasonic dispersion device, a sol is supplied into the dispersion chamber through the sol inlet while the ultrasonic vibrator operates. The sol is dispersed by ultrasonic waves generated from the probe in the dispersion chamber. After the dispersion, the resultant sol is outwardly discharged from the dispersion chamber through the sol outlet.

With the constructions of the above ultrasonic dispersion devices, since the dispersion is carried out by a direct contact between the sol and the probe, the time needed for the dispersion is shortened, and the dispersion efficiency is increased. However, the direct contact between the sol and the probe results in an erosion of the probe, thereby producing impurities. Since the produced impurities are introduced into the sol, the purity of sol is lowered, thereby degrading the quality of the resultant silica glass.

A conventional ultrasonic dispersion device of the indirect type includes a water tank filled with water, an ultrasonic vibrator disposed on the bottom of the water tank, and a container floated in the water bath and filled with a sol. Ultrasonic waves generated from the ultrasonic vibrator are transmitted to the water in the water bath and the sol in the container, so that the sol is dispersed by the ultrasonic waves transmitted through the water.

With the construction of this conventional ultrasonic dispersion device of the indirect type, since the dispersion is indirectly carried out through water, no impurity is introduced into the sol. However, the time needed for the dispersion is extended. Furthermore, a variation in dispersion degree may occur depending on the positional level of the sol within the container.

Other examples of the conventional art involving ultrasonication are seen in the following U.S. Patents. U.S. Pat. No. 4,861,615, to Toki et al., entitled Silica Glass Formation Process, describes a process for forming silica glass articles using a sol gel method. The patent describes ultrasonication of a sol with simultaneous stirring.

U.S. Pat. No. 6,060,523, to Moffett et al., entitled Continuous Process For Preparing Microgels, describes a process in which a sol is turbulently mixed and aged as the sol passes through an elastically deformable vessel such as a pipe or tube. An ultrasonic vibrator is used to deform the walls of the vessel for the purpose of removing deposits.

U.S. Pat. No. 6,063,894, to Phipps et al., entitled Process For Purifying Polymers Using Ultrasonic Extraction, describes a process in which polymer pellets suspended in a cavitable liquid pass through a J-tube and are ultrasonicated by means of transducers externally mounted on the J-tube.

SUMMARY OF THE INVENTION

It is therefore an object of the present invention to provide an improved apparatus for ultrasonication of a silica sol.

A further object of the invention is to provide an ultrasonication apparatus which shortens the time needed for the dispersion procedure.

A yet further object is to prevent the introduction of impurities into the sol during ultrasonication.

Another object of the present invention to achieve a more uniform dispersion of silica sol.

In order to accomplish the above objects, the present invention provides an apparatus for dispersing a silica sol. The apparatus of the present invention includes a sol feeder filled with a sol; a sol container for receiving and containing a ultrasonically dispersed sol; a medium tank filled with a liquid-phase ultrasonic medium; an ultrasonic vibrator for generating ultrasonic waves within the tank; and a sol pipe for providing a sol feeding path connecting the sol feeder and the sol container to each other, the sol pipe having a portion submerged under the ultrasonic medium filled in the medium tank. A pump for pumping sol through the sol pipe may also be provided.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
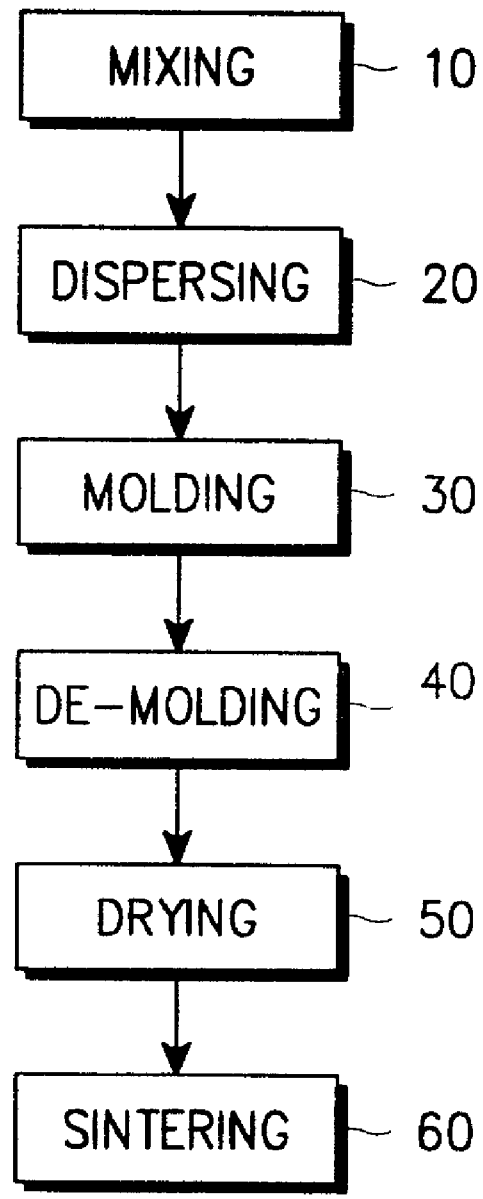
FIG. 1 is a flowchart illustrating a general method of manufacturing silica glass by a sol-gel method.

Turning now to the drawings, FIG. 1 is a flow chart of the general method of manufacturing a silica glass tube by the sol-gel method discussed above. As shown in FIG. 1, a silica glass tube is manufactured using a mixing process 10, a dispersing process 20, a molding process 30, a de-molding process 40, a drying process 50, and a sintering process 60.

In the mixing and dispersing procedures 10 and 20, a starting material is mixed with deionized water and an additive such as a dispersing agent so that the starting material is uniformly dispersed in the deionized water, thereby forming a uniform sol. The starting material may include silicon alkoxide or fumed silica. In particular, the dispersing procedure 20, which is adapted to uniformly disperse the start material in the deionized water, is a very important process in determining the uniformity of the final silica glass product.

In the molding procedure 30, the sol produced in the mixing and dispersing procedures 10 and 20 is poured into a mold having a proper shape, for gelation. To the sol is added a binder and a gelling agent to aid in forming particle-to-particle bonds. The mold, which is used to mold a silica glass tube, for example, a substrate tube or an over-jacket tube, has a construction including a cylindrical portion and a central rod portion received in the cylindrical portion.

In the de-molding procedure 40, the gel molded to have a tube shape in the molding procedure 30 is removed from the mold. This procedure may be carried out in a water tank to prevent the gel tube from being damaged.

In the drying procedure 50, the gel tube removed from the mold is dried using a drying means with a constant temperature and humidity chamber, and then subjected to a thermal treatment at a low temperature in order to remove or decompose residual molecular water and any organic materials present in the gel tube. And then, the gel tube is heated in an atmosphere of Cl gas to remove metallic impurities and hydrides.

In the sintering procedure 60, the formed body made via the drying procedure 50 is sintered so that it is glassified. As a result, a desired silica glass product is obtained. This procedure is carried out by heating the dried and impurity-removed gel to a temperature of 1,350° C. to 1,400° C. in a sintering furnace in an atmosphere of He gas.

The dispersing procedure is carried out by a special ultrasonic dispersion device. Conventional ultrasonic dispersion devices may be classified as direct type or indirect type devices, the direct type devices being divided into direct-static type and direct-dynamic type devices.

Figure 2:
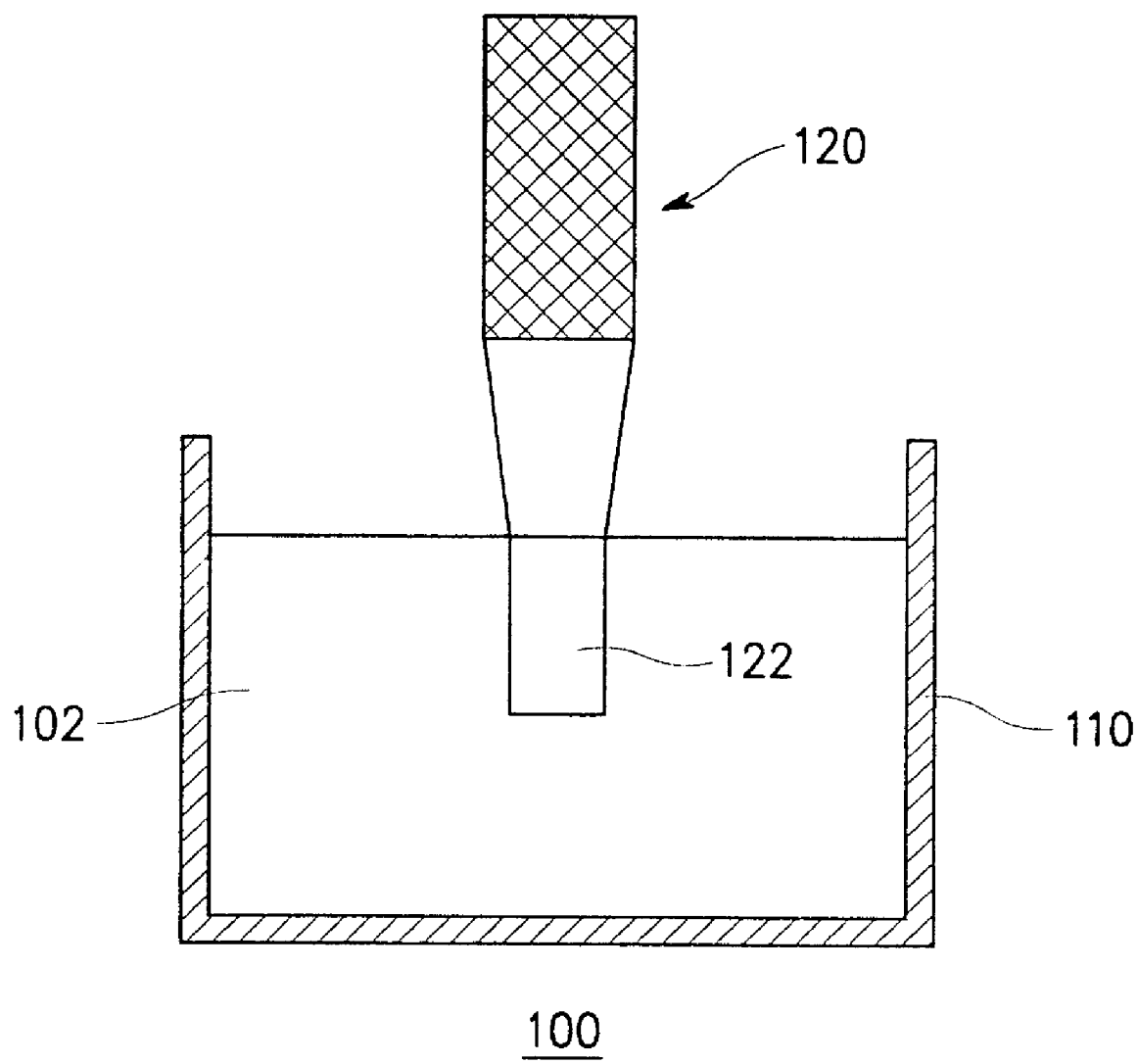
FIG. 2 is a perspective view illustrating the construction of a conventional ultrasonic dispersion apparatus of a direct-static type.

FIG. 2 is a perspective view illustrating the construction of a conventional ultrasonic dispersion device of the above mentioned direct-static type. This ultrasonic dispersion device, which is denoted by the reference numeral 100 in FIG. 2, includes a water bath 110 with the top being opened, and a rod-shaped ultrasonic vibrator 120 with a probe 122. In a dispersion process using this conventional ultrasonic dispersion device, the probe 122 of the ultrasonic vibrator is in direct contact with a sol 102 contained in the water bath 110. The ultrasonic vibrator 120 is moved left and right or forward and rearward to disperse the sol 102 in the water bath 110 by ultrasonication.

Figure 3:
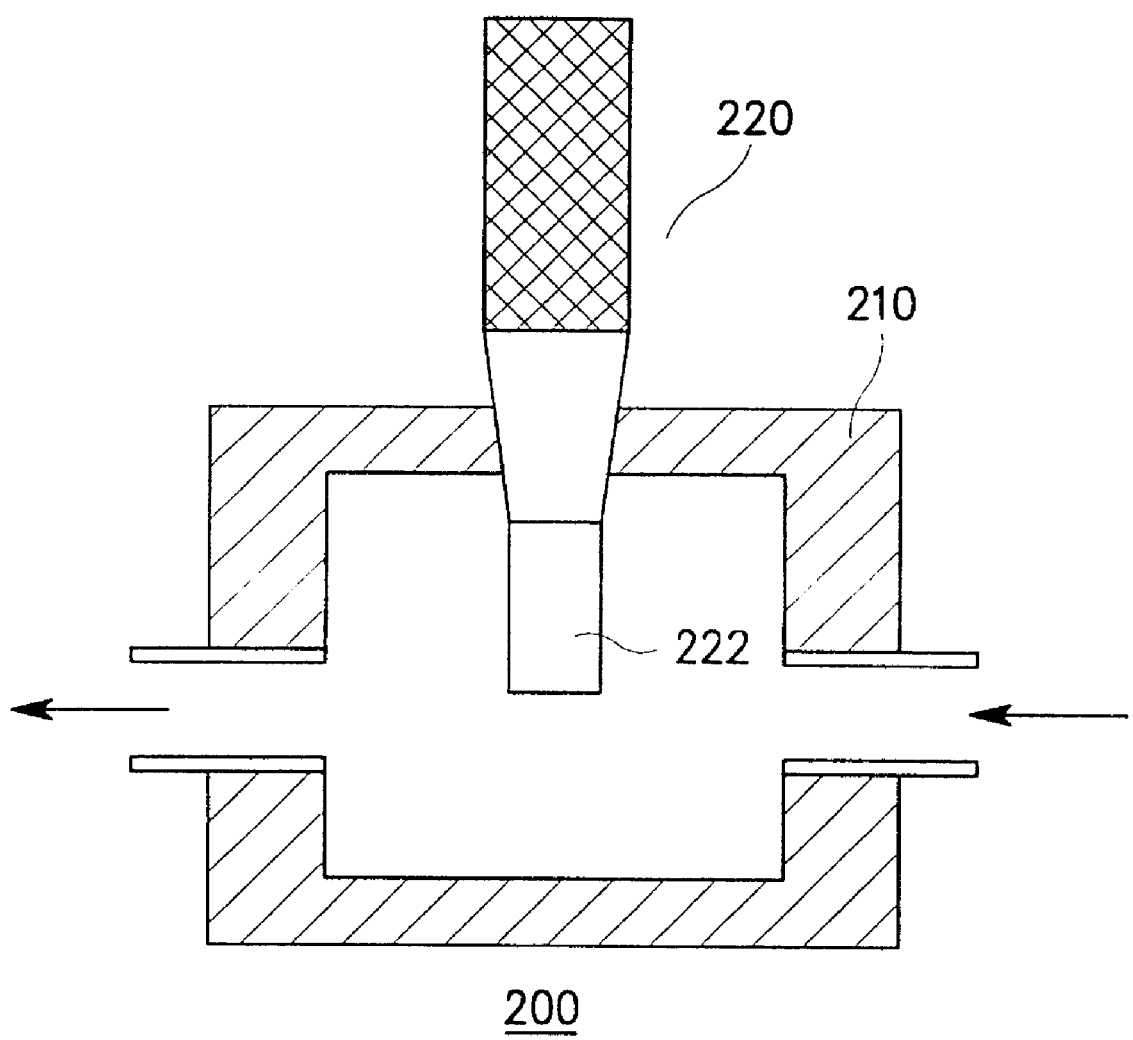
FIG. 3 is a perspective view illustrating the construction of a conventional ultrasonic dispersion apparatus of a direct-dynamic type.

FIG. 3 is a perspective view illustrating the construction of a conventional ultrasonic dispersion device of the direct-dynamic type. The ultrasonic dispersion device, which is denoted by the reference numeral 200 in FIG. 3, includes a dispersion chamber 210 having a sol inlet and a sol outlet, and an ultrasonic vibrator 220 with a probe 222 positioned in the dispersion chamber 210. In a dispersion process using this ultrasonic dispersion device, a sol is supplied into the dispersion chamber 210 through the sol inlet while the ultrasonic vibrator 220 operates. The sol is dispersed by ultrasonic waves generated from the probe 222 in the dispersion chamber 210. After the dispersion, the resultant sol is outwardly discharged from the dispersion chamber 210 through the sol outlet.

With the constructions of the above ultrasonic dispersion devices 100 and 200, since the dispersion is carried out by a direct contact between the sol and the probe, the time needed for the dispersion is shortened, and the dispersion efficiency is increased. However, the direct contact between the sol and the probe results in an erosion of the probe, thereby producing impurities. Since the produced impurities are introduced into the sol, the purity of sol is lowered, thereby degrading the quality of the resultant silica glass.

Figure 4:
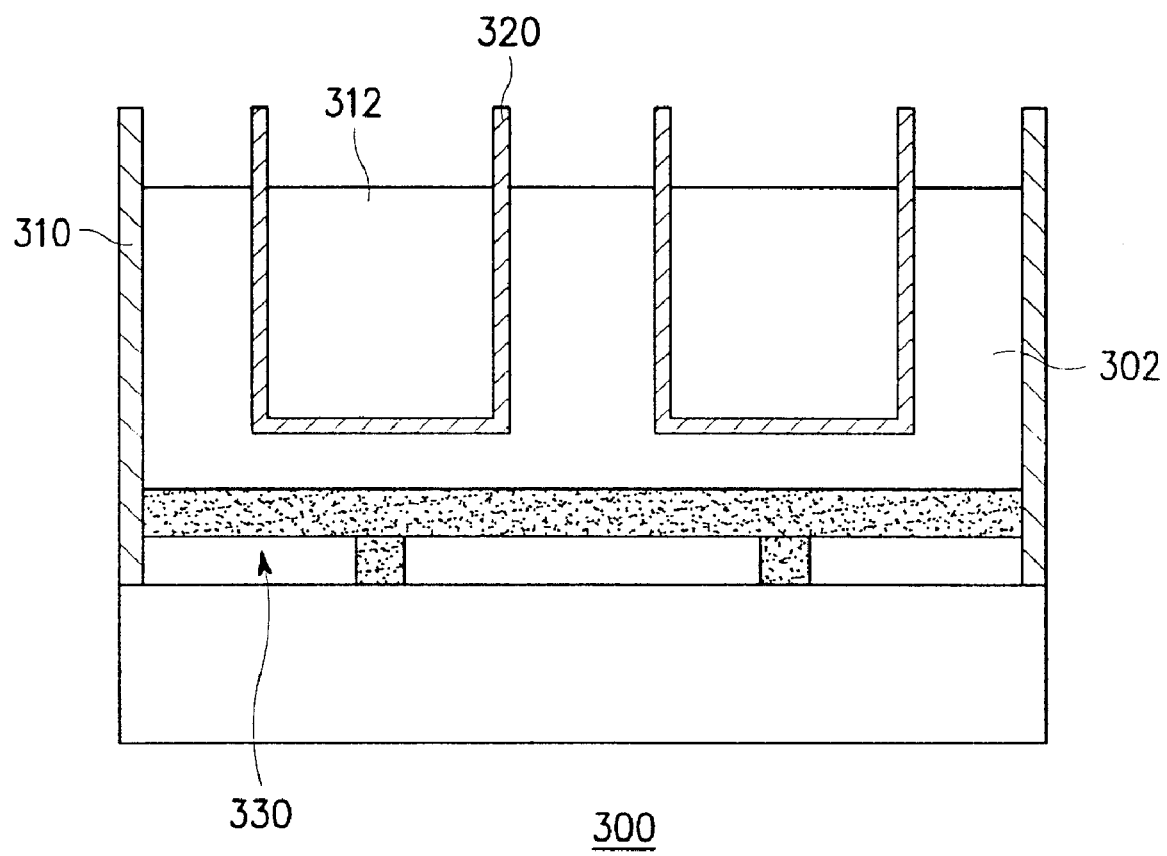
FIG. 4 is a perspective view illustrating the construction of a conventional ultrasonic dispersion apparatus of an indirect type.

FIG. 4 is a perspective view illustrating the construction of a conventional ultrasonic dispersion device of the indirect type. This ultrasonic dispersion device, which is denoted by the reference numeral 300 in FIG. 4, includes a water tank 310 filled with water 302, an ultrasonic vibrator 330 disposed on the bottom of the water tank 310, and a container 320 floated in the water bath 310 and filled with a sol 312. Ultrasonic waves generated from the ultrasonic vibrator 330 are transmitted to the water 302 in the water bath 310 and the sol 312 in the container 320, so that the sol 312 is dispersed by the ultrasonic waves transmitted through the water 302.

With the construction of this conventional ultrasonic dispersion device 300 of the indirect type, since the dispersion is indirectly carried out through water, no impurity is introduced into the sol. However, the time needed for the dispersion is extended. Furthermore, a variation in dispersion degree may occur depending on the positional level of the sol within the container.

The preferred embodiments of the present invention will now be explained in detail with reference to the accompanying drawings. In the following description of the present invention, a detailed description of known functions and configurations incorporated herein will be omitted when it may make the subject matter of the present invention rather unclear.

Figure 5:
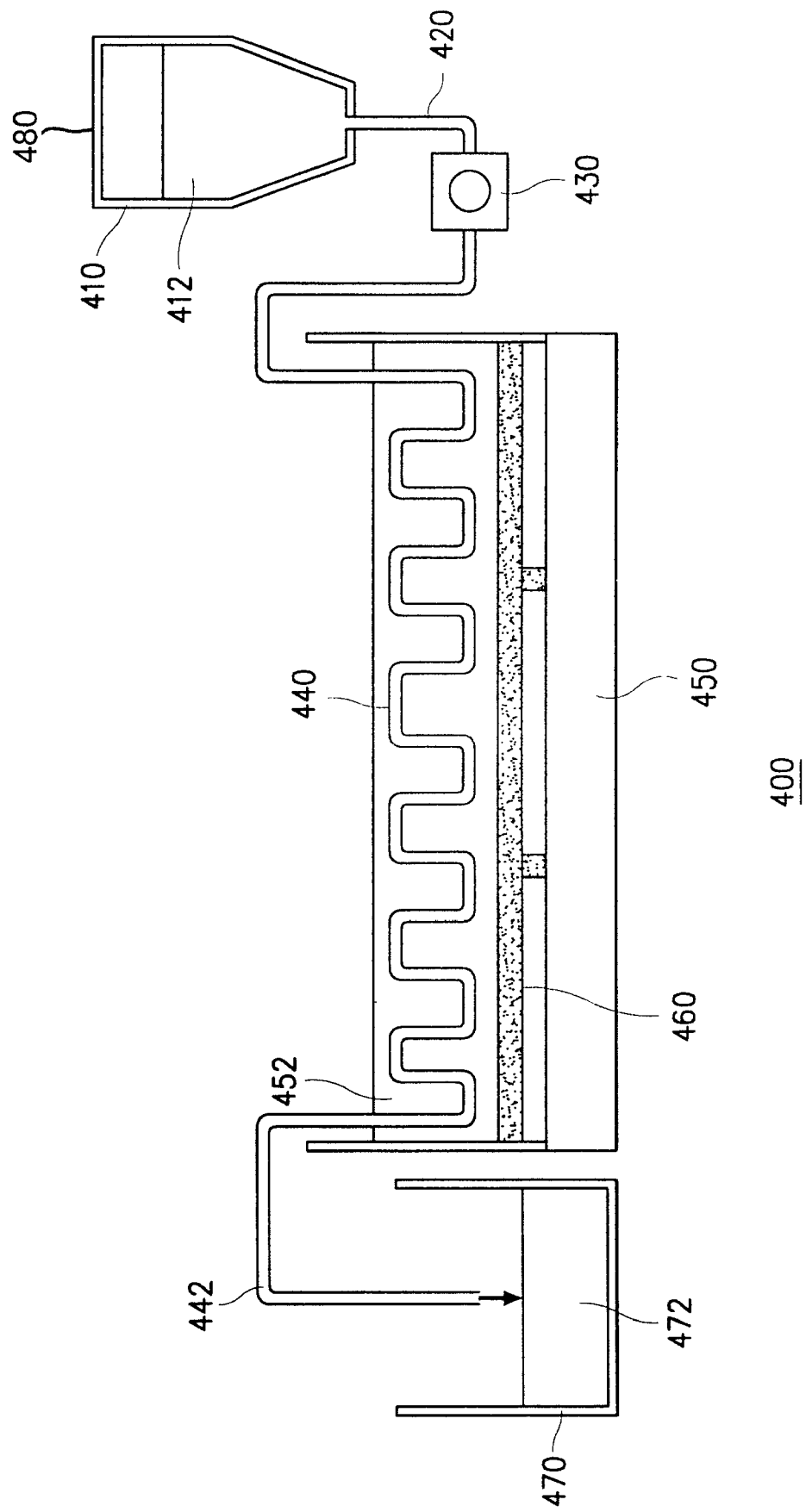
FIG. 5 is a view illustrating the structure of an ultrasonic dispersion apparatus according to a preferred embodiment of the present invention.

FIG. 5 is a view illustrating the structure of an ultrasonic dispersion apparatus according to a preferred embodiment of the present invention. As shown in FIG. 5, the ultrasonic dispersion apparatus 400 according to a preferred embodiment of the present invention includes a sol feeder 410, a pump 430, a sol pipe 440, a medium tank 450, an ultrasonic vibrator 460, and a sol container 470.

The sol feeder 410 is designed to contain a sol 412. The sol 412 is a mixture of a starting material with deionized water. The sol feeder 410 includes an upper cover 480 for preventing external impurities from being introduced into the interior of the sol feeder 410. The sol feeder 410 is also provided with a sol outlet at the bottom, and sol feeder 410 may have a hopper shape as shown in FIG. 5.

The sol pipe 440 is an area where the sol is ultrasonically dispersed. The sol pipe 440 connects the sol feeder 410 to the sol container 470, at one end of sol pipe 440 is provided an input end 420 for receiving the sol from the sol feeder 410 and, at the other end, an output end 442 for discharging the dispersed sol into the sol container 470. The sol pipe 440 is positioned in such a fashion that it is submerged under an ultrasonic medium 452 contained in the tank 450, except for the input and output ends 420 and 442. The sol pipe 440 is made of a polymer or glass material exhibiting no chemical reaction with the sol.

In the illustrated embodiment, the portion of the sol pipe 440 sunk under the ultrasonic medium 452 has a shape bent in a zigzagged fashion. Here, "zigzag" will be generally taken to mean that the pipe has numerous bends changing the direction of the sections of the pipe along the pipe's overall length within the ultrasonic medium. The bends in the pipe may be in the vertical, or height, direction or the horizontal, or width direction. The zigzag may be in any of a number of overall shapes. For example, as illustrated in FIG. 5, the zigzag may be in a general square-wave shape in is the vertical direction.

With such a zigzag bent construction of the sol pipe, the dispersing area of the sol is increased, and the sol moves up and down or left and right during the dispersion process thereof. Accordingly, the sol moving in the sol pipe 440 may be dispersed continuously and uniformly.

The pump 430 provides a force needed to feed the sol from the sol feeder 410 to the sol container 470. The pump 430 is positioned in the vicinity of the input end 420 of the sol pipe 440. Embodiments are also possible in which the sol is fed from the sol feeder 410 to the sol container 470 without using the pump 430. In an embodiment without a pump, the sol feeder 410 should be positioned at a level higher than the level of the container 470 so that the sol may move from the sol feeder 410 to the sol container 470 by virtue of the sol's own weight, that is, by gravity feed.

The medium tank 450 contains an ultrasonic medium 452 selected to transmit ultrasonic waves generated by the ultrasonic vibrator 460 to the sol. The dimensions of the tank 450 may vary depending on the quantity of sol to be produced and the production rate. Water may be used as the ultrasonic medium 452. Other ultrasonic media having good characteristics of transmitting ultrasonic waves may be used.

The ultrasonic vibrator 460 generates ultrasonic waves when a driving voltage is applied thereto. The ultrasonic waves generated from the ultrasonic vibrator 460 are transmitted to the sol, moving in the sol pipe 440, via the ultrasonic medium 452, thereby causing particles of the sole to be uniformly dispersed. The ultrasonic waves also serve to reduce the viscosity of the sol. Alternatively, the ultrasonic vibrator 460 may be positioned on the bottom or inner wall of the medium tank 450.

The ultrasonic waves are sound waves of an inaudible frequency band above 20,000 Hz, while the frequency of ultrasonic waves used in the industrial dispersion process ranges typically from 20,000 Hz to 40,000 Hz. The ultrasonic waves cause the sol particles to vibrate mechanically while passing through the medium.

The sol container 470 serves to receive the ultrasonically dispersed sol 472. The sol container 470 may include an upper cover (not shown) for blocking an introduction of impurities into the interior of the sol container 470.

Now, the procedure of ultrasonically dispersing the silica sol by the ultrasonic dispersion apparatus of the present invention having the above mentioned configuration will be described. A sol 412 is prepared by any of a variety of methods, such as with use of a high shearing mixer, and is then placed in sol feeder 410. The sol 412 contained in the sol feeder 410 is fed to the interior of the sol pipe 440 by the pump 430. The sol 412 passes through the zigzagged portion of the sol pipe 440 submerged under the ultrasonic medium 452 contained in the medium tank 450. While passing through the zigzagged portion of the sol pipe 440, the sol 412 is uniformly dispersed by ultrasonic waves generated from the ultrasonic vibrator 450. The dispersed sol is then discharged into the sol container 470 through the output end 442 of the sol pipe 440.

As apparent from the above description, in accordance with the ultrasonic dispersion apparatus of the present invention, there is no possibility of an introduction of impurities into a sol being subjected to a dispersion process because the dispersion of the sol is conducted in the sol pipe. In accordance with the present invention, the dispersion of the sol is conducted in a continuous fashion so that the time taken for the dispersion is reduced. In addition, a uniform sol dispersion is achieved.

While this invention has been described in connection with what is presently considered to be the most practical and preferred embodiment, it is to be understood that other modifications thereof may be made without departing from the scope of the invention. Thus, the invention should not be limited to the disclosed embodiment, but should be defined by the scope of the appended claims and their equivalents.

What is claimed is:

1. An apparatus for ultrasonically dispersing a sol, comprising:
   a sol feeder for holding a sol to be ultrasonically dispersed, said sol feeder having a sol outlet;
   a sol pipe connected at one end to the sol outlet of the sol feeder, a portion of the length of said sol pipe having a zigzagged arrangement;
   a tank containing a medium for transmitting ultrasonic waves, the zigzagged portion of said sol pipe being immersed in the medium in said tank;
   an ultrasonic vibrator located in said tank, for producing ultrasonic waves in said medium; and
   said sol pipe terminating in an output end outside of the medium of said tank, for outputting sol flowing through the sol pipe.

2. The apparatus of claim 1, further comprising:
   a sol container positioned under said output end of the sol pipe, for receiving sol from the sol pipe.

3. The apparatus of claim 1, said sol pipe further comprising:
   a zigzag section which extends vertically.

4. The apparatus of claim 1, said sol pipe further comprising:
   a zigzag section which extends horizontally.

5. The apparatus of claim 1, the zigzagged portion of the sol pipe having a square-wave shape.

6. The apparatus of claim 5, the sol pipe having zigzag sections which extend vertically.

7. The apparatus of claim 1, the zigzagged portion of the sol pipe having bends of approximately 90°.

8. The apparatus of claim 1, said sol pipe being made of a polymer or a glass which is unreactive with the sol.

9. The apparatus of claim 1, said medium being a liquid.

10. The apparatus of claim 9, said medium being water.

11. The apparatus of claim 1, further comprising:
    a pump positioned in the sol pipe for pumping sol through the sol pipe.

12. The apparatus of claim 1, said sol feeder being positioned higher than the output end of said sol pipe, for allowing gravity feeding of the sol through the sol pipe.

13. The apparatus of claim 1, said sol feeder being hopper-shaped.

14. The apparatus of claim 1, further comprising:
    an upper cover on said sol feeder.

15. The apparatus of claim 2, further comprising:
    an upper cover on said sol receiver.

16. The apparatus of claim 1, said ultrasonic vibrator being positioned on an inner side wall of said tank.

17. The apparatus of claim 1, said ultrasonic vibrator being positioned on the bottom of said tank.

18. A method for ultrasonically dispersing a sol, comprising the steps of:
    preparing a silica sol;
    introducing said silica sol into a pipe having a zigzagged portion which is submerged under a medium for transmitting ultrasonic waves;
    producing ultrasonic waves in the medium for ultrasonically dispersing the silica sol passing through the pipe; and
    receiving the ultrasonically dispersed silica sol from an output end of the pipe.

19. The method of claim 18, said step of preparing a silica sol further comprising:
    mixing the sol with a high shearing mixer.

20. The method of claim 18, further comprising the step of:
    molding the received, ultrasonically dispersed sol into a substrate tube or an over-jacketing tube for use in making an optical fiber preform.

21. The method of claim 18, said step of introducing the silica sol into the pipe further comprising:
    pumping the silica sol into the pipe.

22. The method of claim 18, said step of introducing the silica sol into the pipe further comprising:
    gravity-feeding the silica sol into the pipe.

23. The method of claim 18, further said zigzagged portion of the pipe having a zigzag section which extends vertically.

24. The method of claim 18, further said zigzagged portion of the pipe having a zigzag section which extends horizontally.

* * * * *